Patented Mar. 14, 1944

2,344,137

UNITED STATES PATENT OFFICE 2,344,137

PIGMENTED RESIN AND METHOD OF MAKING

Folsom E. Drummond and William A. Waldie, Dayton, Ohio, assignors, by mesne assignments, to Chemical Developments Corporation, Dayton, Ohio, a corporation of Ohio No Drawing. Application August 26, 1940, Serial No. 354,256

8 Claims. (Cl. 260—22)

This invention relates to a pigmented resin useful in the compounding of paints, enamels, lacquers, inks and plastic compositions.

Heretofore it has been the conventional practice to grind pigment in oil or the like to thoroughly disperse the particles whereby the pigmented paste formed could be incorporated with additional ingredients to form uniformly colored compositions.

It is an object of this invention to provide a pigmented resin wherein the pigment is uniformly dispersed throughout the resin during the making of the resin without grinding the pigment in order to effect dispersion of the particles.

Another object of this invention is to devise a method for making a pigmented resin from carbon black, lamp black and the like pigments, wherein the resinous product has the pigment uniformly dispersed throughout the resin forming a homogeneous uniformly colored product without requiring grinding of the pigment in order to effect dispersion thereof.

Another object is to provide a method of making synthetic resinous compositions in the form of a black, pasty resin which is adapted for use in compounding plastics, rubber, paints, enamels, lacquers, inks, linoleum and cements.

Another object is to provide a pigmented resinous composition wherein the pigment is mixed with certain of the resin forming constituents and subsequently reacted together to form a resin while simultaneously effecting dispersion of the pigment throughout the product.

Another object is to produce a resinous composition having a sufficiently high concentration of dispersed pigment which can be stored and shipped in containers in the form of a substantially solid paste-like resin which can subsequently be used in compounding various manufactured products.

Another object is to provide a pigmented resinous product which is adapted for use in making printing inks such as used in intaglio, rotogravure and lithographic processes. By utilizing the pigmented resin of this invention the protracted grinding of pigment with a vehicle in preparing the inks is eliminated producing inks at lower cost.

These and other objects and advantages will appear hereinafter in the description given.

In general, this invention involves the making of a pigmented resinous composition wherein the pigment or coloring matter is dispersed uniformly throughout the product without requiring protracted grinding of the pigment with a vehicle in order to effect dispersion of the pigment as has been the conventional practice heretofore. This is broadly accomplished by making an alkyd type resinous product by reacting polybasic acids and polyhydric alcohol with fatty acids wherein the fatty acid is initially mixed with the pigment to bring about a thorough coating of the pigment particles with the fatty acid, which coating functions as a wetting agent bringing about a thorough deflocculation and dispersion of the pigment particles when incorporated in the other constituents in the forming of the resin. After the pigment particles have been coated with the fatty acid ingredient, which may be previously dissolved in a solvent such as xylol or toluol, the thus coated pigment is refluxed with the solvent for several hours and thereafter the solvent is substantially removed by distillation. The resulting pigmented gel-like product is then incorporated with the polybasic acid and polyhydric alcohol and reacted to form the pigmented alkyd resin. In a similar manner, the pigment-fatty acid gel can be incorporated in a phenol-formaldehyde resin product and other synthetic resinous products as a pigmented modifying agent to form a pigmented resin.

In order to illustrate this invention, the following typical examples of the method of producing the pigmented resinous product are described.

Example I

Approximately 260 parts by weight of linseed fatty acids are dissolved in 250 parts of xylol. To this fatty acid-xylol solution 30 parts by weight of carbon black are admixed and the mixture refluxed for approximately 4 hours at 150 degrees C. Thereafter the xylol solvent is substantially removed by distillation and 148 parts by weight of phthalic anhydride and 90 parts by weight of glycerine are introduced into the mixture and the mixture heated with constant stirring for approximately 5 hours at a temperature of 200 degrees C. The product formed is a black, resinous paste wherein the pigment is homogeneously dispersed forming a smooth paste similar to products made wherein the pigment is ground in oil.

As a typical example, for illustrating the utility of the pigmented resin of this invention, the pigmented product was used in formulating an enamel which comprised the following composition:

Parts by weight
Resinous paste (Example I) --- 3
Resin (alkyd type, i. e., "Beckosol") --- 4
Metallic drier --- ⅛
Toluol --- 1

The coating composition formed was sprayed on a panel and baked at 250 degrees F. for one hour producing a hard smooth finish having good hiding power and uniformly dispersed pigment. It will be appreciated therefore that this invention provides a pigmented product which is adapted for use in formulating various products, as heretofore mentioned, at a substantial saving in cost over similar products made wherein the pigment is dispersed in a constituent part of the composition by grinding the same together.

*Example II*

In this instance, 250 parts by weight of linseed oil fatty acids are thoroughly mixed with 50 parts by weight of carbon black so as to thoroughly coat the particles of carbon black with fatty acids. Thereafter 250 parts by weight of xylol are added and the mixture refluxed, as in Example I. After removal of the xylol by distillation, the resultant pigment-fatty acid mixture is reacted with 150 parts by weight of phthalic anhydride and 90 parts by weight of glycerine. In carrying out the reaction, the mixture is constantly stirred and heated at a temperature of approximately 200 degrees C. for about 4½ to 5 hours to form a paste-like resinous composition wherein the pigment is uniformly dispersed throughout the composition.

The product formed is similar to that of Example I and when incorporated with other ingredients to form a coating composition has a somewhat greater hiding power. By first coating the pigment with fatty acids, a greater amount of pigment can be incorporated and when this is desired, the method of Example II is followed.

In compounding the aforementioned compositions, linseed oil fatty acids and carbon black have been utilized, but it is to be understood that various other drying oil and semi-drying oil fatty acids may be employed in place of linseed fatty acids with similar results. Likewise, lamp black and other pigments may be used as a substitute for carbon black where other pigmented resinous compositions are desired. Further, different pigment mixtures, as well as mixtures of fatty acids, may be used for forming the pigmented resinous compositions of this invention. Toluol and other solvents may be employed in place of xylol.

It will be obvious that our pigmented-fatty acid composition may be combined with a cellulose derivative, such as nitrocellulose, cellulose acetate and the like to produce pigmented cellulose compositions which may be utilized in the formulation of lacquers and plastics. Various modifying agents, such as plasticizers and oils may be incorporated as constituents in compounding the pigmented resin product of this invention.

It will be understood that this invention is adapted for uses where pigmented resin or pigmented gel constituents are required to be incorporated in making a product. It will further be understood that this invention is not limited to the particular examples given and that the process may be varied as required for different conditions and uses to which the product formed is to be subjected.

Having thus fully described our invention, what we claim as new and desire to secure by Letters Patent is:

1. The method comprising dissolving fatty acids selected from the group consisting of drying oil fatty acids, semidrying oil fatty acids and mixtures thereof in hydrocarbon solvent, adding to the resulting solution a quantity of pigment, refluxing the pigmented mixture for several hours, removing the solvent by distillation, adding to the residue polycarboxylic acid and polyhydric alcohol, and heating the mixture with constant stirring for several hours, whereby there is formed a homogeneous resinous paste in which the pigment is finely and uniformly dispersed adapted for incorporating in enamels, lacquers, inks, and the like.

2. The method comprising dissolving linseed oil fatty acids in hydrocarbon solvent, adding to the resulting solution a quantity of pigment, refluxing for approximately four hours at a temperature of about 150° C., removing the solvent by distillation, adding to the residue polycarboxylic acid and polyhydric alcohol, and heating the mixture at about 200° C. with constant stirring for approximately 5 hours, whereby there is formed a homogeneous resinous paste in which the pigment is finely and uniformly dispersed adapted for incorporating in enamels, lacquers, inks, and the like.

3. The method comprising dissolving approximately 260 parts by weight of fatty acids selected from the group consisting of drying oil fatty acids, semidrying oil fatty acids and mixtures thereof in approximately 250 parts of hydrocarbon solvent, adding to the resulting solution approximately 30 parts of lamp black, refluxing the pigmented mixture for approximately 4 hours at about 150° C., removing the solvent by distillation, adding to the residue approximately 148 parts by weight of phthalic anhydride and approximately 90 parts by weight of glycerol, and heating the mixture at a temperature of about 200° C. with constant stirring for approximately 5 hours, whereby there is formed a homogeneous resinous paste in which the pigment is finely and uniformly dispersed adapted for incorporating in enamels, lacquers, inks, and the like.

4. The method comprising dissolving 260 parts by weight of linseed oil fatty acids in 250 parts by weight of xylol, adding to the resulting solution 30 parts by weight of carbon black, refluxing the pigmented mixture for approximately 4 hours at about 150° C., removing the solvent by distillation, adding to the residue 148 parts by weight of phthalic anhydride and 90 parts by weight of glycerol, and heating the mixture at a temperature of about 200° C. with constant stirring for approximately 5 hours, whereby there is formed a homogeneous resinous paste in which the pigment is finely and uniformly dispersed adapted for incorporating in enamels, lacquers, inks, and the like.

5. A homogeneous pigmented resinous paste in which the pigment is finely and uniformly dispersed prepared according to the method of claim 1, said paste being adapted for incorporating in enamels, lacquers, inks, and the like.

6. A homogeneous pigmented resinous paste in which the pigment is finely and uniformly dispersed prepared according to the method of claim 2, said paste being adapted for incorporating in enamels, lacquers, inks, and the like.

7. A homogeneous pigmented resinous paste in which the pigment is finely and uniformly dispersed prepared according to the method of claim 3, said paste being adapted for incorporating in enamels, lacquers, inks, and the like.

8. A homogeneous pigmented resinous paste in which the pigment is finely and uniformly dispersed prepared according to the method of claim 4, said paste being adapted for incorporating in enamels, lacquers, inks, and the like.

FOLSOM E. DRUMMOND.
WILLIAM A. WALDIE.